UNITED STATES PATENT OFFICE.

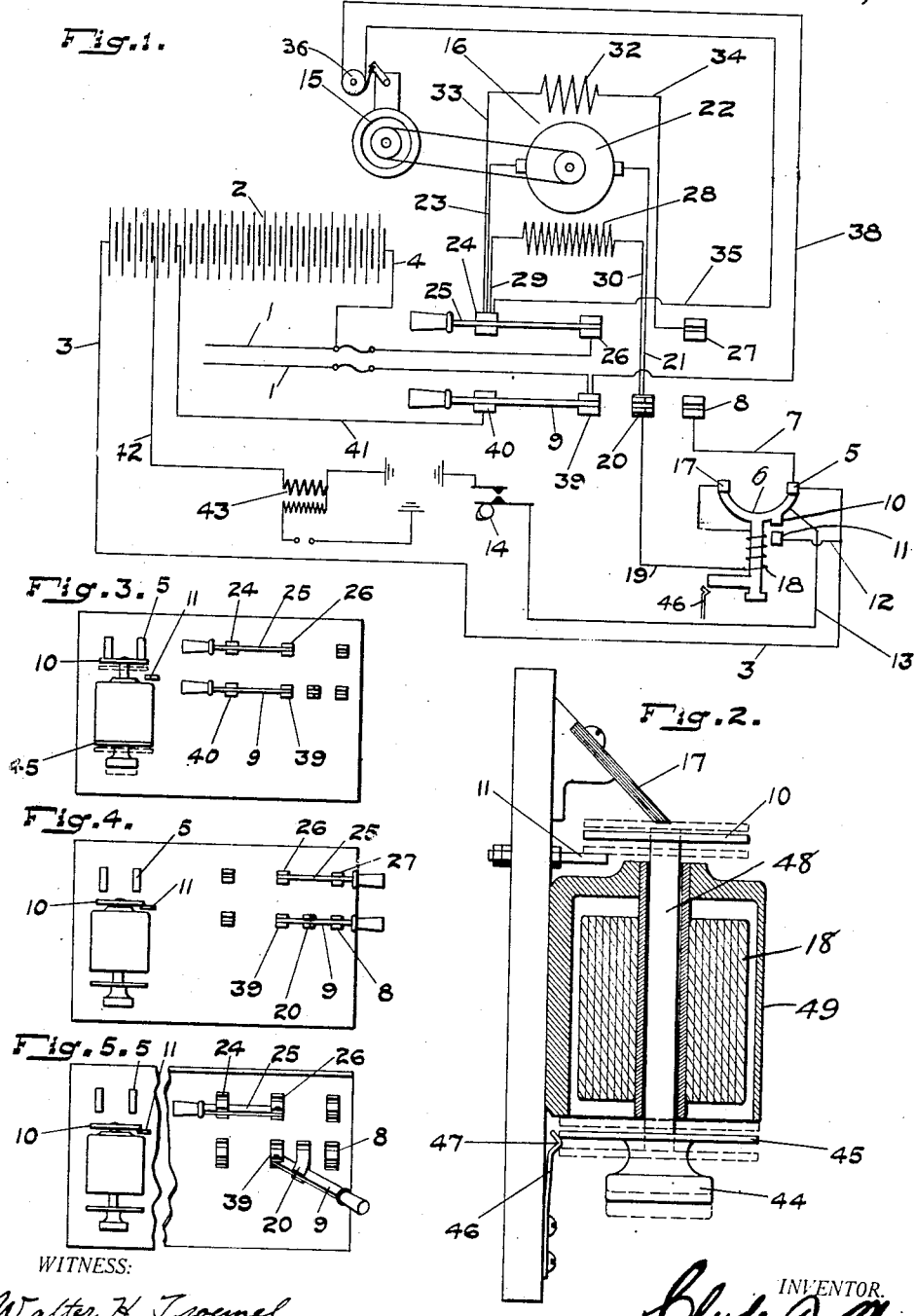

CLYDE J. MYERS, OF INDIANAPOLIS, INDIANA, ASSIGNOR TO SWARTZ ELECTRIC COMPANY, OF INDIANAPOLIS, INDIANA, A CORPORATION OF INDIANA.

ELECTRIC-POWER SYSTEM.

1,355,410.  Specification of Letters Patent.  Patented Oct. 12, 1920.

Application filed November 15, 1918. Serial No. 262,710.

*To all whom it may concern:*

Be it known that I, CLYDE J. MYERS, a citizen of the United States, residing at Indianapolis, Marion county, and State of Indiana, have invented and discovered certain new and useful Improvements in Electric-Power Systems, of which the following is a specification.

My invention relates to electric power systems and the object of the invention is to provide means whereby, in a system employing a plurality of sources of electric energy, such as a storage battery and a generator set, the adjustment of means constituting an automatic circuit breaking means and an ignition controlling switch may be effected by a single, common operation.

With this object in view my invention is embodied in preferable form, construction and arrangement hereinafter described and illustrated in the accompanying drawings.

In these drawings, Figure 1 is a diagrammatic view of the system showing the invention applied thereto, and showing the parts in position to charge the battery and supply energy to the line; Fig. 2, a side view in elevation partly in section of the combined circuit breaker and switch employed in the invention; Fig. 3, a front view in elevation of a switchboard showing the circuit breaker and switches in the positions they are adapted to occupy when the system is taking current from the generator and charging the battery and supplying the line therefrom; Fig. 4, a similar view showing the circuit breaker and switches in the positions they occupy in starting the system in operation, and Fig. 5, a view partly in elevation but with the right hand part in perspective showing the parts on the switchboard in the position they occupy when the system is adapted to take current from the generator set alone.

Referring to the drawings, 1 indicates the load line, 2 a storage battery, 3 the positive battery lead and 4 the negative battery lead. The lead 3 connects with a contact 5 of a circuit breaker 6; a line 7 connects this contact 5 with a switch terminal 8 of a knife-blade switch, of which 9 is the swinging arm. The contact 5 constitutes one of an upper pair of fixed spring contacts for the circuit breaker 6 toward and from which the core thereof is movable. 10 indicates a contact disk at the upper end of the core 48 and 11 a fixed contact below the core contact 10 and connected by the line 12 with the lead line 3 or otherwise to the circuit including the contact 5. Line 13 connects the core 48 of the circuit breaker to a timer 14 of an internal combustion engine 15 employed as the prime mover adapted to drive the dynamo electric machine 16. The other fixed contact 17 of the circuit breaker is connected through the coil 18 thereof and line 19 to the terminal 20 of main switch 9, which by line 21 is connected to one side of the armature 22 of the dynamo electric machine which operates either as a motor or a generator. The other side of the armature is connected by line 23 to the terminal 24 of upper main switch 25 pivoted on terminal 26, switch 25 being also adapted to contact with terminal 27. The shunt winding 28 of the dynamo electric machine is connected by lines 29 and 30 with the terminal 24, and the auxiliary terminal 20 which is controlled by the switch arm 9 and which has a longer contact arm than that of terminal 8 as seen from Fig. 5, whereby contact may be made with said terminal 20 independently of terminal 8. The series winding 32 of the dynamo electric machine is in the circuit 24, 33, 34 and 27. The terminal 24 is also connected by line 35 with a voltage controlled governor 36 adapted to control the throttle of the prime mover 15. Line 38 leads from the governor to the pole 39 of the main lower switch 9 which pole is also connected to the main line 1. A terminal 40 of the switch 9 connects on one side by lead 41 with the negative side of a six cell unit of the battery. The ignition is obtained at the proper voltage by connecting lead 42 with the negative side of a four cell unit adjacent the side of the battery which is connected with the positive battery lead 3.

The core 48 of the circuit breaker 6 is provided at its lower end with a knob 44 of insulating material whereby it may be pushed up or pulled down to enable contact to be manually made between the core and the fixed contact. On this non-magnetic core is also mounted a disk 45 which is of magnetic material for attraction by the soft iron sleeve 49. This disk is adapted to bear against a spring 46 which constitutes both a stop, and a catch or detaining member. To this end the spring 46 is free at its upper end and is provided near such end with an outwardly bent shoulder 47. This shoulder is adapted to serve as a stop to limit the downward movement of the core 48 when the magnetic attraction through the circuit breaker 6 has decreased to such an extent as to permit the descent of the core 48, thus breaking contact with the upper fixed contacts 5 and 17 whereby the core 48 is held in intermediate or neutral position between the upper contacts 5 and 17 and the lower fixed contact 11. As indicated in Fig. 2, this spring shoulder 47 also serves as a detaining means to hold the contact disk 10 of the core 48 down against the contact 11 when the core 48 is pulled down by the knob 44 so as to carry the disk 45 below the shoulder 47.

The operation is as follows:

Starting. (See Fig. 4.)

For starting, the main switches 25 and 9 are thrown to the right to engage the terminals 27, 8 and 20 respectively. The core 48 is then pulled down so as to carry the core disk 45 below the shoulder 47 and carry the contact disk 10 into engagement with the ignition circuit contact 11.

The circuit will then be from battery 2 through lead 3, contact 5, line 7, terminal 8, switch 9; also through line 21, armature 22, line 23, terminal 24, line 33, series winding 32, line 34, terminal 27, switch 25, terminal 26 and lead 4 to the battery, thus completing the armature circuit; also from terminal 20, through shunt winding 28 which is permanently connected across the armature to terminal 24 back through line 23, series winding 32, line 34 through switch 25, contact 26 and line 4 to battery, thus completing the shunt circuit; also from contact 11 through disk 10 of circuit breaker 6, line 13, timer 14 to ground, coil 43, line 42, lead 3 back to contact 11, thus completing the ignition circuit. The circuit of the circuit breaking coil 18 is broken at 17.

By the establishment of these circuits the dynamo electric machine is started as a motor so as to thereby drive the prime mover, and the ignition element for the engine put into action.

After the engine has become fully started it overruns the dynamo electric machine causing the latter to run as a generator. Thereupon, the switches 9 and 25 are adjusted to either of the positions indicated in Figs. 3 or 5, according to the mode of operation desired.

Charging the battery and supplying energy to load line.

Thus, if it is desired to both charge the battery 2 and supply current to the line 1 the switches are thrown to the position indicated in Figs. 1 and 3. The upper switch 25 is thrown to the left to engage terminal 24 and the lower switch 9 to the left to engage terminal 40. The circuit breaker core 48 is pushed up manually by means of the knob 44 until its contact disk 10 engages the fixed contacts 5 and 17, the ignition circuit remaining closed, however, through the circuit breaker disk 10 and line 13. In this arrangement energy for the load lines 1 is taken from the negative battery lead 4 and intermediate point on the battery through the lead 41.

The circuit breaker 6 is now capable of automatic operation to cut out the generator set 22 when the current demand in the battery 2 falls below a predetermined amount. When this condition occurs, then the decrease of current through the circuit breaker 6 will cause the core 48 to fall, breaking the connection with contacts 5 and 17, the core 48 being stopped by the engagement of the disk 45 with shoulder 47 of the spring 46. When the engine stops, if it is desired to take current from the full battery the switch 9 is then thrown to the right against contacts 20 and 8. The system then continues to receive energy from the battery 2 until the latter is discharged to the point where it is advisable to recharge, whereupon the starting and charging operations of the switches are repeated. Figs. 1 and 3 illustrate the position that the switches 9 and 25 and circuit breaker 6 occupy in charging the battery 2 and supplying energy to the load lines 1 before the engine has stopped. When the switches are in the positions indicated in Figs. 1 and 3 the circuit is as follows:—

From armature 22, line 21, contact 20, line 19 through winding 18 of the circuit breaker 6, contact 17, across circuit breaker 6 to contact 5 through lead 3 to battery 2, from battery 2 through lead 4 to contact 26, switch 25, contact 24, line 23, armature 22. The shunt circuit is from winding 28, to contact 20, through winding 18 of circuit breaker 6, contact 17, across circuit breaker 6 to contact 5 through line 3 to battery 2. Then out of battery 2 on line 4 to contact 26, switch 25, contact 24 and shunt 28. The circuit of series winding 32 is open at 27. The voltage governor circuit is out of armature 22 through line 23, contact 24, line 35, governor 36, line 38, contact 39, and switch 9, contact 40, lead 41 through six cells of battery 2. The ignition circuit is out of battery lead 3, circuit breaker contact 5, through circuit breaker contact disk 10 through line 13, timer 14 to ground, from ground through coil 43, line 42 through four cells of battery 2. The line circuit is out of armature 22, through line 23, terminal 24, switch 25, contact 26 to line 1, back through outer line 1 to contact 39, switch 9, contact 40, line 41 to battery 2 at the negative terminal of the governor circuit.

*Energy to line from generator alone.*

To supply energy to the line from the generator alone the upper switch 25 is thrown to the left to engage the terminal 24, the lower switch 9 is thrown into engagement with the long contact 20 only, and the circuit breaker core 48 is pulled down below the shoulder 47 so as to carry the contact disk 10 into engagement with the ignition contact 11. The arrangement of the switchboard in this method of operation is illustrated in Fig. 5.

This arrangement avoids drawing current from the battery, and if desired, dry cells may be employed for the starting ignition.

In this arrangement the ignition is the same as defined with respect to Fig. 4, and the battery circuit is open at 8. The generator circuit goes from terminal 24 through switch 25, terminal 26, to line 1, back through other line 1, to terminal 39, switch 9, terminal 20 to generator 22, the series winding 32 being cut out as in Fig. 3. The voltage governor 36 in this case is across the terminals of the generator 22.

*Energy from battery alone.*

To supply energy from the battery 2 alone to the line 1, the upper switch 25 is thrown out, the lower switch 9 to the right to engage both contacts 8 and 20, the contact disk 10 and circuit breaker 6 moved to neutral position, as indicated in full lines in Fig. 2, and the circuit is then as follows:

From battery 2 through lead 4 to line 1, back through other line 1, to terminal 39, switch 9, terminal 8, line 7, contact 5, line 3 to battery. The generator circuit is broken at the terminals 24 and 27, and the ignition circuit broken at 11.

Having thus described my invention, what I claim is:—

1. In an electric power system, in combination with a battery, a generator set including a dynamo electric machine and an internal combustion engine, a load line and ignition circuit, and a manually operated combined circuit breaker and ignition switch, including a core and coil and fixed contacts in the ignition circuit adapted to be alternately engaged by the core, and means for holding the core out of contact with the ignition circuit and load line when the current demand in the battery falls below a predetermined amount and the core drops.

2. In an electric power system, in combination with a battery, a generator set including a dynamo electric machine and an internal combustion engine, a load line, an ignition circuit, a circuit breaker including a core and coil subject to changes in current demand in the battery, a core contact, fixed contacts including an ignition circuit contact above the movable core contact and a fixed ignition contact below the same, means for holding the core contact in neutral position between the fixed contacts said core being manually operable to carry it against either ignition contact.

3. In an electric power system, in combination with a battery, a generator set including a dynamo electric machine and an internal combustion engine, a load line, an ignition circuit, a circuit breaker including a core and a coil responsive to changes in current demand in the battery, a core contact, a pair of fixed contacts above the core contact, one of said fixed contacts being in the ignition circuit, a fixed ignition contact below the core contact, a core detaining spring member below the core having a shoulder, and a member carried by the core and adapted to be stopped by said shoulder to hold the core in circuit breaking position and to retain the core against the lower ignition contact when the engaging member is pulled down below the shoulder.

In witness whereof, I have hereunto set my hand and seal at Indianapolis this 5th day of November, A. D. nineteen hundred and eighteen.

CLYDE J. MYERS. [L. S.]

Witnesses:
W. P. DOOLITTLE,
M. L. SHULER.